Aug. 4, 1964
C. O. BROWN
3,143,029
SET SCREW WITH CENTER OF GRAVITY LOCATED TO PERMIT ORIENTATION
Filed March 28, 1960
2 Sheets-Sheet 1
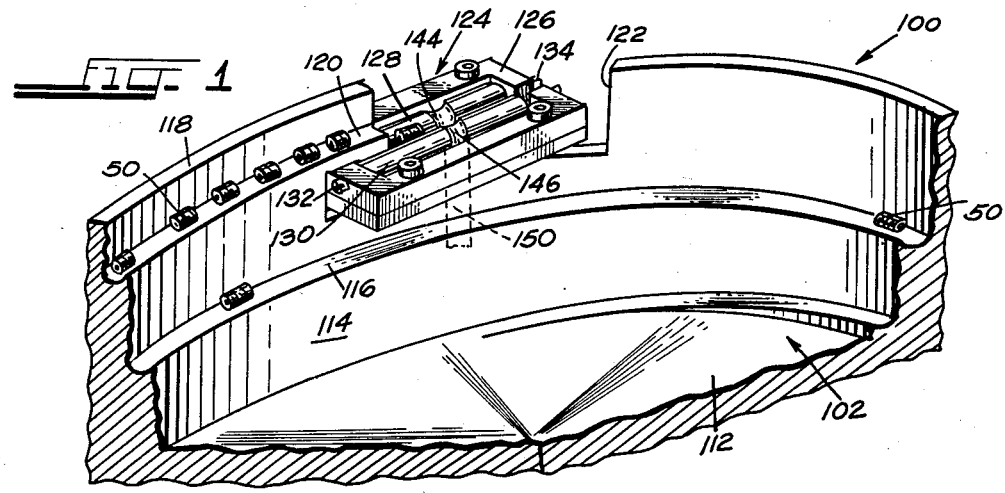
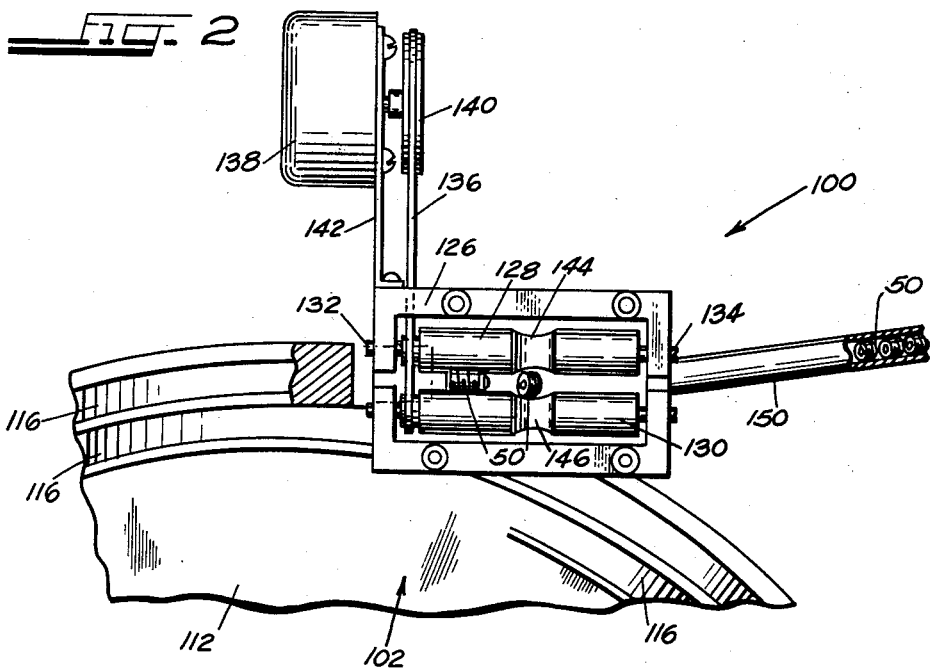
INVENTOR.
CALVIN O. BROWN
BY
Prangley, Baird, Clayton, Miller & Vogel
ATTYS.

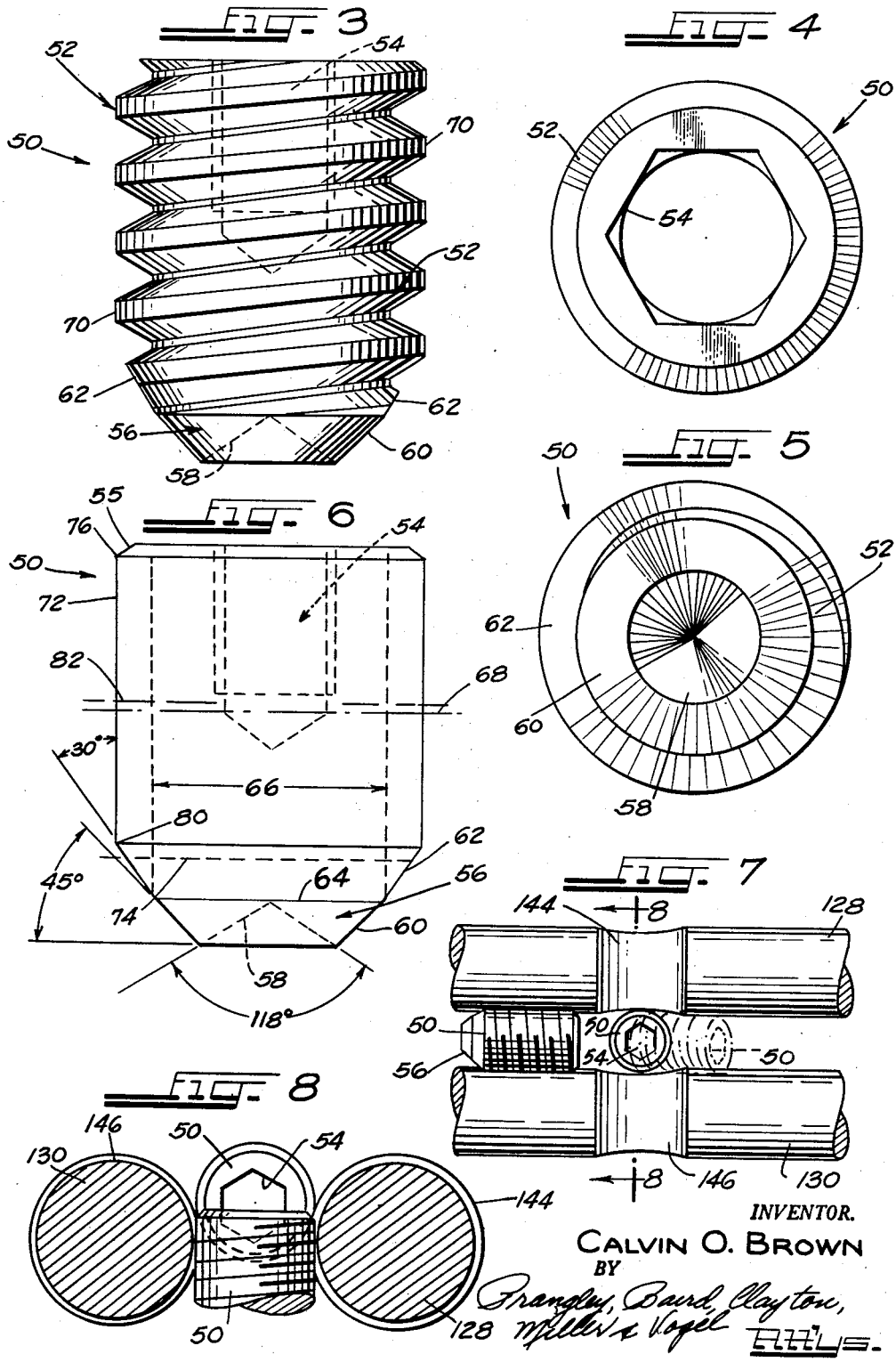

United States Patent Office 3,143,029
Patented Aug. 4, 1964

3,143,029
SET SCREW WITH CENTER OF GRAVITY
LOCATED TO PERMIT ORIENTATION
Calvin O. Brown, Bartlett, Ill., assignor to Set Screw &
Mfg. Company, Bartlett, Ill., a corporation of Illinois
Filed Mar. 28, 1960, Ser. No. 18,105
2 Claims. (Cl. 85—1)

This invention relates to screws, and particularly to small headless set screws specifically shaped to facilitate automatic orienting and feeding thereof by machine.

There is disclosed in the copending application for United States Letters Patent Serial No. 514,299, filed June 9, 1955, for Machine for and Method of Feeding and Orienting Headless Screws, now Patent No. 3,069,049 granted December 18, 1962, a machine which is adapted to orient and feed headless set screws in the same axial and end relationships without materially altering the normal structural or functional characteristics of the set screws. The machine described in the copending application and like machines depend basically upon the fact that headless set screws to be oriented thereby are gravitationally asymmetric, i.e., that the center of gravity of the set screws is located nearer to one end thereof than to the other. The orienting machines in general include a pair of spaced apart rollers having aligned grooves therein, the spacing between the major portion of the rollers being such that a set screw is supported thereby, i.e., more particularly, the crests of the threads of the set screw contact the surfaces of the rollers, the crests of the threads forming in essence a support cylinder extending the length of the full thread. The distance across the grooves in the rollers is greater than the major diameter of the screw, and therefore greater than the diameter of the support cylinder, so that the set screw can drop therethrough endwise. If the center of gravity of the set screw is displaced toward one end of the screw with respect to the longitudinal mid-point of the support cylinder, then that end of the set screw in which the center of gravity is located will tip downwardly into the aligned grooves whereby further to orient the set screw with respect to the ends thereof.

In the case of certain types of set screws such as cup-point set screws, the center of gravity is located longitudinally substantially at the longitudinal mid-point of the support cylinder so that the set screws are not positively oriented with respect to the ends but instead are haphazardly oriented in a very unsatisfactory and random manner. Efforts have been made heretofore to overcome this situation by shifting the center of gravity which often has resulted in an impairment of the end use of the set screw or has introduced other problems in the handling thereof.

Accordingly, it is an important object of the present invention to provide improved headless set screws which can be more easily oriented by machines used heretofore in the art operating upon gravimetric principles, whereby to insure the proper orientation of the set screws thereby.

Another object of the invention is to provide an improved headless set screw which has the center of gravity displaced a substantial distance from the mid-point of the support cylinder defined by the crests of the full threads thereof, whereby to improve the orientation thereof by machines operating on the gravimetric principle.

Yet another object of the invention is to provide an improved headless set screw of the type set forth in which the amount of thread available is substantially undiminished and the set screw retains all of the holding power and all other important features thereof although having a structure that lends itself better to gravimetric orientation.

Still another object of the invention is to provide an improved headless set screw of the type set forth which can be more easily guided into the hole adapted to receive it.

These and other objects and advantages of the invention will be better understood from a consideration of the following description when taken in conjunction with the accompanying drawings. In the drawings wherein like numerals designate like parts throughout:

FIGURE 1 is a perspective view of a fragment of a vibratory hopper bowl with one form of roller type orienting device connected therewith, whereby screws of the invention when placed in bulk and haphazard array within the hopper bowl can be fed in single file succession and in axial alignment from the bulk or mass within the hopper bowl to the roller orienting mechanism which serves to orient the screws so that corresponding ends are positioned in the same direction, after which the screws are fed in the oriented position to a place of use or disposal;

FIG. 2 is a fragmentary top plan view of the mechanism shown in FIG. 1 and further including the motor for driving the orienting rollers;

FIG. 3 is a large scale view of a socket head cup-point set screw, the screw represented being a No. 6–32 x ¼" NC, Class 2 fit;

FIG. 4 is a plan view of the socket end of the set screw of FIG. 3;

FIG. 5 is a plan view of the cup-point end of the set screw of FIG. 3;

FIG. 6 is a simplified diagrammatic view of the set screw of FIG. 3;

FIG. 7 is an enlarged plan view of the orienting rollers like those shown in FIGS. 1 and 2 and illustrating the manner in which the rollers serve to orient the set screw if the set screw is fed to the grooves in the roller socket end first; and FIG. 8 is an enlarged view in vertical section through the rollers of FIG. 7 substantially as seen in the direction of the arrows along the line 8—8 thereof.

The set screw of the present invention is particularly adapted to be oriented in the combined bowl hopper and roller orienting mechanism illustrated in FIGS. 1 and 2 of the drawings and further disclosed and claimed in the copending application Serial No. 514,299 filed June 9, 1955, now Patent No. 3,069,049. Set screws to be oriented in such mechanisms must be headless and must have the center of gravity thereof displaced a significant distance from the longitudinal mid-point of the support cylinder defined by the crest of the full thread on the set screw. The set screw of the present invention is made by modifying a standard form of headless set screw to provide a set screw which can be more readily handled and oriented by automatic machines and yet retains all of the valuable performance characteristics of the standard unmodified set screw.

There is shown in FIGS. 3, 4 and 5 of the drawings a headless set screw made in accordance with and embodying the principles of the present invention, the set screw being generally designated by the numeral 50. Except for the modification made thereto in accordance with the present invention, the set screw 50 is a standard No. 6–32 x ¼" NC, Class 2 fit set screw of the cup-point type. The dimensions for such a set screw are set forth in Screw Thread Standards for Federal Services, 1944, Handbook H28 (1944), U.S. Dept. of Commerce, National Bureau of Standards, the 1950 Supplement thereto and Screw-Thread Standards for Federal Services, 1957, Handbook H28 (1957)—Part I, U.S. Department of Commerce, National Bureau of Standards. According to those standards, the set screw 50 has an allowable thread crest or major diameter within the range 0.1304" minimum to 0.1380" maximum, a minor diameter of 0.997"

maximum, and a pitch diameter of 0.1150″ minimum to 0.1177″ maximum.

Referring now also to FIG. 6 of the drawings, the dimensions for the set screw 50 of an actual production example will be given. The overall length is 0.250″ minimum of 0.260″ maximum and the major diameter is as set forth above but is preferably held to within the range 0.1340″ to 0.1380″. A preferred material of construction is rolled 4140 steel which is heat treated after final forming after which it is cadmium plated. The pitch diameter of the thread 52 formed on the set screw 50 before plating is preferably held within the range 0.1145″ to 0.1172″ and after plating within the range 0.1150″ to 0.1177″.

One end of the set screw 50 is provided with a socket 54 which is formed by drilling a hole having a diameter within the range 0.061″ to 0.063″ after which the socket 54 is formed hexagonal in shape with a width across the flats in the range 0.0625″ to 0.0635″. The outer edge of the set screw at the socket end is provided with a 0.025 x 37½° chamfer as at 55.

The other end of the set screw is provided with a cup-point 56 having an internal conical wall 58 formed to have an included angle of 118° and having a maximum internal diameter of 0.064″ to 0.074″. An outer flank surface 60 is provided on the cup-point 56 and is illustrated as being formed at an angle of 45° with respect to the longitudinal axis of the set screw 50 whereby to provide the usual cup-point 56 for the set screw 50.

In accordance with the present invention a further beveled surface 62 is provided on the set screw 50 adjacent to the cup-point 56, the beveled surface 62 being frusto-conical in shape and having the surface thereof disposed at an angle of approximately 30° with respect to the longitudinal axis of the set screw 50. The outer flank 60 of the cup-point intersects the beveled surface 62 in a line which is essentially a circle before threading of the blank from which the set screw 50 is formed, the circle at the junction thereof being indicated by the numeral 64 in FIG. 6. The diameter of the circle 64 may be equal to or slightly less than the minor or root diameter of the set screw 50 which is indicated by the numeral 66 in FIG. 6. In a preferred form of the set screw 50, the diameter of the circle 64 is 0.005″ less than the root diameter of the thread 52 on the set screw 50 but it is to be understood that the diameter of the circle 64 may be as great as the root diameter and may be as much as 0.010″ less than the root diameter.

Preferably the angle of the beveled surface 62 with respect to the longitudinal axis of the set screw 50 is always different from and preferably less than the angle between the outer flank 60 of the cup-point and the longitudinal axis of the set screw 50. It has been found that the angle of the beveled surface 62 with respect to the longitudinal axis of the set screw 50 may be from about 15° to about 35°. In general, the greater the length of the set screw 50 with respect to its diameter, the smaller should be the angle of the beveled surface 62 with respect to the longitudinal axis, and vice versa, the smaller the length of the set screw 50 with respect to its diameter, the greater should be the angle of the surface 62 with respect to the longitudinal axis of the set screw 50.

Referring again specifically to FIG. 6 of the drawings, before the beveled surface 62 is formed on the standard No. 6–32 x ¼″ NC, Class 2 fit set screw 50, the center of gravity will lie substantially in the plane designated by the line 68 in FIG. 6 of the drawings. During orientation using the orienting mechanism of FIGS. 1 and 2 to be described later, the set screw 50 is supported upon the crest 70 of the threads 52 which bear against the orienting rollers. The crest 70 of the thread 52 defines a support cylinder designated generally by the numeral 72 in FIG. 6 and extending from the chamfer 55 to the intersection thereof with the outer flank 60 before modification thereof by the addition of the beveled surface 62, that line of intersection being designated by the numeral 74 in FIG. 6. More specifically, the set screw 50 before modification by adding the beveled surface 62 is supported upon the orienting rollers along a support cylinder 72 which extends from the intersection with the chamfer surface 55 at 76 to the intersection with the outer flank 60 (extended). It has been found that with cup-point set screws of the type illustrated in FIGS. 3 to 6, the center of gravity along the plane 68 was substantially at the longitudinal mid-point of the support cylinder 72, i.e., the line 68 in FIG. 6. As a consequence, when the set screw 50 is fed along the orienting rollers toward the grooves therein, it will tend to tip and pass through the opening formed by the grooves regardless of which end, i.e., the socket end or the point end, is foremost. As a result there is substantially no orienting of the set screw with respect to the ends when the standard shape of said screw is fed to the orienting mechanism.

By adding the beveled surface 62, the support cylinder 72 extends from the plane 76 to a plane 80 which is the intersection of the support cylinder 72 and the beveled surface 62. The mid-point of the support cylinder 72 is now along the plane designated by the line 82 in FIG. 6 whereby the center of gravity along the plane 68 is definitely and positively disposed toward the cup-point 56. As a result the set screw 50 is positively oriented with the cup-point downward regardless of which end of the set screw is foremost as the set screw 50 approaches the grooves in the orienting rollers.

Although substantially any of the orienting machines provided heretofore which operate upon the gravimetric principle may be used to orient and feed the improved set screw 50, the mechanism illustrated in FIGS. 1 and 2 of the drawings are particularly useful for that purpose. Further details not here shown are more fully disclosed and described in the copending application Serial No. 514,299 filed June 9, 1955, now Patent No. 3,069,049. The orienting mechanism 100 of FIGS. 1 and 2 includes a circular bowl generally designated by the numeral 102 which has a conical interior bottom surface 112 upon which the set screws to be oriented are received. This formation of the bowl bottom 112 facilitates the flow of set screws outwardly toward the side wall 114 of the bowl which is so formed as to provide a ramp or conveyor track 116 in the form of a conical spiral, the radius vector of which increases constantly from the juncture of the bowl interior bottom surface 112 with the bowl side wall 114 to the upper edge or rim 118 where the spiral track 116 merges with a track portion 120 which is straight and extends tangentially with respect to the bowl 102. The side wall 114 is cut away as at 122 and under the track section 120 so that the track section 120 will overhang or jut over the orienting roller mechanism 124 which is disposed in the recess 122 as will be described more fully hereinafter. The transverse or radial width of the track 116 is made only slightly greater than the diameter of the set screws so that the set screws will be forced into single file automatically with the axes thereof aligned in the direction of travel.

The hopper bowl 102 is supported through springs upon a massive base member and an electromagnetic motor produces impulses which react upon the hopper bowl 102 and the screws within which causes the screws to move radially outward to the bowl side wall 114 and thence in a circular or spiral path onto the spiral track 116, and thence up that track onto and outward to the end of the tangential track portion 120 from which the screws drop one by one onto the orienting rollers. The means for supporting and vibrating the bowl 102 is shown more fully in the Spurlin Patent No. 2,696,292 issued December 7, 1954, and in the aforesaid copending application Serial No. 514,299, now Patent No. 3,069,049.

The orienting roller mechanism 124 includes a frame 126 in which is mounted a pair of similar orienting rollers 128 and 130 which are disposed so that one of the ends thereof lies beneath the end of the tangential track section 120. Each of the rollers 128 and 130 is substantially cylindrical throughout the length thereof and is provided with a groove intermediate the ends thereof. Each roller is mounted for rotation about its longitudinal axis between a pair of adjustable screw trunnions 132 and 134 which are carried in alignment with one another by the frame 126. That end of each of the rollers 128 and 130 which is adjacent to the tangential track section 120 is reduced in diameter and provided with a circumferentially extending groove which serves as a pulley for a belt 136 which transmits power to the rollers from an electric motor 138 which drives a pulley 140 that engages the belt 136. The motor 138 is shown mounted by means of a bracket 142 on the frame 126. The belt drive is arranged to rotate the rollers in such a direction that a point on the surface of each as it approaches a corresponding point on the surface of the other will be moving upwardly. Preferably, the mechanism 124 is mounted on the bowl 102 and in such a manner as to be adjustable vertically and also about the horizontal axis normal to a vertical plane parallel to the tangential track section 120.

The rollers 128 and 130 are preferably disposed with their axes lying in the same horizontal plane or in a plane tipped slightly downwardly toward the end of the rollers disposed away from the track section 120. The distance between the rollers is such as to provide a slot of uniform width throughout their co-extensive lengths except for the grooves 144 and 146 formed therein, the width of the slot defined by the rollers being such as to support a set screw to be oriented by engagement with the crests of the thread thereof. More specifically, the rollers 128-130 are so spaced that the minimum width of the slot between them as defined by the lines of intersection of the horizontal plane containing the roller axes with the adjacent side wall surfaces of the rollers will be several thousandths of an inch less than the minimum allowable crest diameter of the standard thread of the standard headless screw of a given size and fit class to be received upon the rollers 128-130. In practice, it has been found that a spacing between 0.002" and 0.005" less than the minimum allowable major or crest diameter of a standard thread of a given fit class and nominal size of screw is entirely satisfactory. The cooperating grooves 144 and 146 may have a depth such that they provide openings having a transverse radius 0.003" to 0.004" greater than the radius of the maximum allowable major or crest diameter of set screws of the nominal size and fit class to be oriented when the rollers are spaced at from 0.002" to 0.005" less than the minimum allowable major or crest diameter of such grooves. As illustrated, the grooves 144 and 146 are elongated in the direction of the axes of the rollers 128-130 and preferably have a length less than the support cylinder of a standard set screw not having the present invention incorporated therein, as will be described more fully hereinafter.

When the grooves 144 and 146 in the orienting rollers 128 and 130 are shaped and spaced as described above, and particularly when the longitudinal extent of the grooves 144 and 146 is less than the distance between the planes 74 and 76 in FIG. 6, than the standard set screw will simply pass over the grooves 144-146 since the support cylinder thereof will be longer than the longitudinal extent of the grooves 144-146. Even if the longitudinal extent of the grooves 144-146 was increased so that a standard set screw of the nominal size and fit class could pass therethrough, there is no assurance that any orienting with respect to the ends of the set screws would be achieved. This results primarily from the fact that the center of gravity along the plane 68 in FIG. 6 is also at the mid-point of the support cylinder for the standard set screw and, accordingly, whichever end of the set screw first reaches the grooves 144-146 will fall downwardly therebetween and into the delivery tube 150.

The set screw 50 of the present invention on the other hand will be accurately oriented as to the ends thereof by the rollers 128-130 when the rollers are spaced apart and are provided with the grooves 144-146 therein having the shape and dimensions set forth above. More specifically, the longitudinal extent of the grooves 144-146 is slightly greater than the length of the support cylinder, i.e., the distance between the planes 76 and 80 in FIG. 6 of the drawings. The center of gravity in the plane 68 is disposed a substantial distance away from the mid-point of the support cylinder which lies along the plane 82, the center of gravity being disposed toward the cup-point end 56 with respect to the mid-point plane 82.

When the set screw 50 is fed along the rollers 128-130 toward the grooves 144-146 therein with the cup-point 56 in the lead, the set screw will continue traveling therealong after the cup-point 56 extends over the opening between the grooves 144-146 and until the center of gravity in the plane 68 passes the edge of the grooves in the orienting rollers. At that time the set screw will begin to tip with the cup-point downwardly and by the time the mid-point plane 82 reaches the edge of the grooves 144-146 the set screw 50 will tilt rapidly into the opening formed by the grooves 144-146 and will fall into the delivery tube 150 with the cup-point end disposed downwardly.

If the set screw 50 proceeds along the orienting rollers 128-130 with the socket end in the lead, the position of the center of gravity in the plane 68 will hold the set screw in a substantially horizontal position and will actually cause the set screw to bridge and pass over the grooves 144-146 from the position illustrated to the left in solid lines in FIG. 7 to that illustrated to the right in dashed lines therein. Thereafter the set screw will tip downwardly with the cup-point 56 disposed downwardly and will fall in the oriented position into the delivery tube 150 (see FIG. 2). Accordingly, the modified set screw 50 will be oriented positively with respect to the ends thereof no matter which end of the set screw is in the lead as the set screw is fed along the rollers 128-130 toward the grooves 144-146.

Accordingly, the provision of the beveled surface 62 on the set screw 50 permits it readily to be oriented in a positive manner with respect to the ends thereof utilizing known feeding and orienting machines operating on the gravimetric principle. It further has been found that the provision of the beveled surface 62 helps to guide the set screw 50 into the hole in which it is to be inserted. This is of particular importance when handling small set screws such as that illustrated in the drawings. These important new features are obtained without sacrificing any of the desirable characteristics of the standard set screw. The provision of the beveled surface 62 leaves the thread 52 substantially intact and, accordingly, the performance of the modified set screw 50 with respect to performance in use such as holding power and the like remains the same.

Although one preferred form of the set screw of the present invention has been illustrated and described, it is to be understood that various changes and modifications can be made therein without departing from the spirit and scope of the invention. Accordingly, the invention is to be limited only as set forth in the following claims.

I claim:

1. A headless set screw comprising a substantially cylindrical body having a longitudinal axis, one end of said body having a work engaging cone-shaped portion extending therefrom and substantially concentric with said longitudinal axis, the other end of said body being recessed for engagement by a torque applying tool for effecting rotation of said screw about said longitudinal axis, a plurality of turns of thread of normal form on said body about the longitudinal axis thereof and extending to said one end thereof, the longitudinal mid-point of the thread turns of normal major diameter of such a screw having the thread turns of normal major diameter extending to an intersection with said cone-shaped portion being located substantially at the center of gravity thereof, and said body portion having an externally tapered surface extending outwardly from said cone-shaped portion to a thread turn of normal major diameter, the angle between said tapered surface and said longitudinal axis being less than the angle between the outer surface of said cone-shaped portion and said longitudinal axis, said tapered surface intersecting said outer surface of said cone-shaped portion along a circle having a diameter no greater than the normal minor diameter of said thread turns, the longitudinal distance between the intersection of said tapered surface and said cone-shaped portion and the intersection of said tapered surface and the major diameter of said thread turns being less than the longitudinal extent of a thread turn, the longitudinal mid-point of the remaining thread turns of normal major diameter of said screw having said tapered surface thereon being displaced substantially from the center of gravity thereof toward said torque applying end, whereby said screw will readily gravimetrically orient itself with said cone-shaped portion down and said screw will have a substantially full normal thread turn immediately adjacent to said cone-shaped portion.

2. The headless set screw set forth in claim 1, wherein said tapered surface is disposed at an angle of from about 15° to about 35° with respect to said longitudinal axis, and said tapered surface intersects said outer surface of said cone-shaped portion along a circle having a diameter between the normal minor diameter of said thread turns and a diameter up to about 0.010" less than said normal minor diameter.

References Cited in the file of this patent

UNITED STATES PATENTS

| | | |
|---|---|---|
| 2,877,680 | Brown | Mar. 17, 1959 |
| 2,197,875 | Odin | Apr. 23, 1940 |